J. C. HORTON.
WATER-WHEELS.
No. 195,215. Patented Sept. 18, 1877.
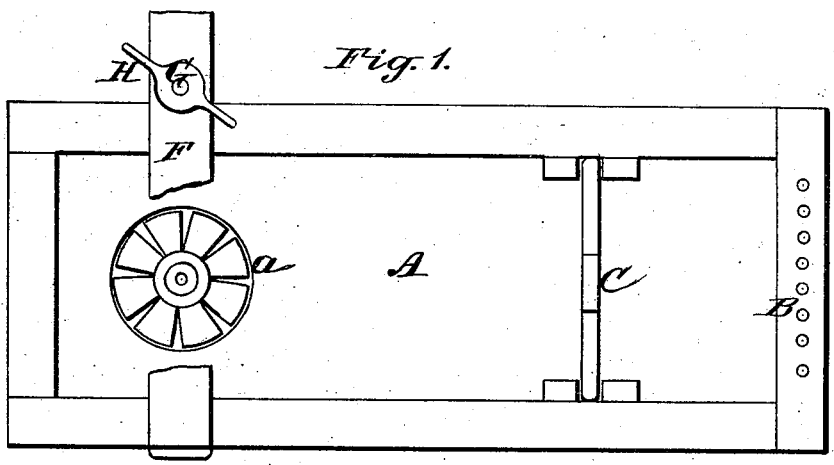
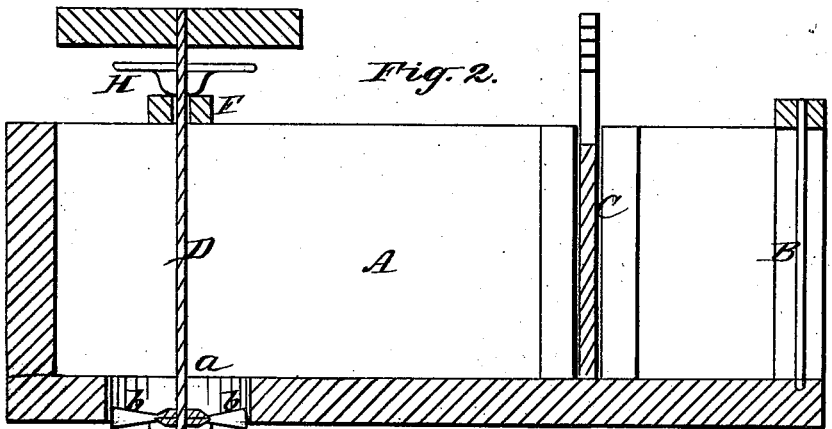
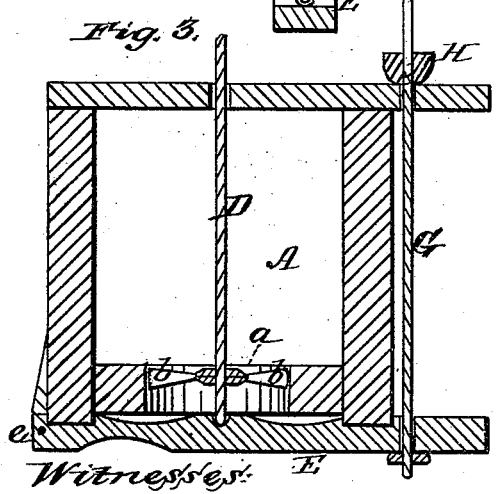
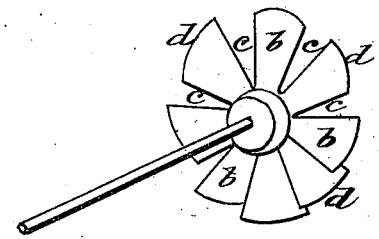
Witnesses:
Floyd Norris.
J. Carpenter.
Inventor:
John C. Horton
by Johnson & Johnson
Att'ys
N. PETERS, PHOTO-LITHOGRAPHER, WASHINGTON, D. C.

UNITED STATES PATENT OFFICE.

JOHN C. HORTON, OF ELKTON, TENNESSEE, ASSIGNOR OF ONE-HALF HIS RIGHT TO NEILL HOLLON, OF SAME PLACE.

IMPROVEMENT IN WATER-WHEELS.

Specification forming part of Letters Patent No. 195,215, dated September 18, 1877; application filed August 24, 1877.

*To all whom it may concern:*

Be it known that I, JOHN C. HORTON, of Elkton, in the county of Giles and State of Tennessee, have invented certain new and useful Improvements in Water-Wheels; and I do hereby declare that the following is a full, clear, and exact description thereof, which will enable others skilled in the art to which it appertains to make and use the same, reference being had to the accompanying drawing, and to the letters of reference marked thereon, which forms a part of this specification.

My improvement consists in arranging the wheel, having inclined buckets without encircling rim, directly within an opening in the bottom of the flume or water-way, in combination with a cross-tree hinged at one end, and connected and supported at the other by a screw-rod passing through a top cross-tie, and made adjustable by a screw-nut, the design being to adapt the wheel to run what is known as a "cock-head" grist-mill without gearing, and mounted directly upon the wheel-shaft.

The inclination of the buckets is proportioned to the head of water, and they extend from the hub in planes to their free widest ends without lapping, and leaving clear openings for the vents.

The vertical adjustment of the wheel brings its buckets nearer to or below the top of the opening, so as to obtain a better effect from the weight of the water within the top of the flume-opening.

I find this simple construction gives the desired speed and power, while the plain form of the buckets lessens the tendency of the wheel to drown by the back-water.

For grist-mills and cotton-gins suitable gearing may be used.

In the drawings, Figure 1 represents a top view of the wheel as applied to the flume; Fig. 2, a longitudinal section, and Fig. 3 a cross-section, of the same; Fig. 4, the wheel.

The flume A is constructed with boards, to receive and confine the water from the race, and is provided with a grating, B, and a gate, C, to regulate and stop the flow of the water to the wheel, which is arranged within the flume, near its closed end, a circular opening, a, being formed in the bottom of the flume, within which the wheel is arranged.

The depth of the opening a through the flume-bottom must be greater than the thickness of the wheel, and of a diameter a little greater than that of the wheel.

The wheel is molded of cast-iron, with plain buckets b, which incline from top to bottom and form the vents c for the water.

The buckets are not connected at their outer widest ends d, but are free, to give a better effect for the water.

The wheel is mounted upon a vertical shaft, D, stepped into a suitable bearing in a cross-tree, E, at the bottom, and a bridge, F, at the top; and the cock-head mill is mounted directly upon said shaft, without gearing.

The cross-tree E is hinged at one end, e, to the flume, and connected at its other end by a vertical screw-rod, G, passing through the upper bridge, and provided with the screw-nut H, by which to adjust the wheel higher or lower in the flume-opening.

The buckets of the wheel increase in width as they extend from the hub, and they incline to the axis of the shaft at an angle to suit the head of water. They do not lap each other; but, on the contrary, leave free vertical openings c, varying in width according to the degree of inclination of the buckets.

By the arrangement of the wheel with the buckets thus formed within a circular opening, a, in the bottom of the flume a very effective and simple construction of wheel is obtained.

I claim—

1. The wheel with the inclined buckets widest at their outer ends and disconnected, arranged within a circular opening, a, in the floor of the flume, for operation as shown and described.

2. The combination of the wheel, arranged in an opening, a, in the floor of the flume, with the hinged cross-tree E, the supporting connecting-rod G, and the adjusting-nut H, all constructed as shown and described.

In testimony that I claim the foregoing I have affixed my signature in presence of two witnesses.

JOHN C. HORTON.

Witnesses:
 THOMAS B. FISHER,
 SAMUEL J. HOLLON.